(12) United States Patent
Pahl et al.

(10) Patent No.: US 6,911,142 B2
(45) Date of Patent: Jun. 28, 2005

(54) OVERHEAD RETURN PIPING SYSTEM

(75) Inventors: Brian W. Pahl, Louisville, KY (US);
Richard Comer, Georgetown, IN (US)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 237 days.

(21) Appl. No.: 10/400,433

(22) Filed: Mar. 28, 2003

(65) Prior Publication Data
US 2003/0183562 A1 Oct. 2, 2003

Related U.S. Application Data

(60) Provisional application No. 60/368,328, filed on Mar. 29, 2002.

(51) Int. Cl.$^7$ .................... F01M 1/10; B01D 36/00
(52) U.S. Cl. .................. 210/167; 210/171; 210/416.5; 210/104

(58) Field of Search ................... 210/167, 168, 210/171, 805, 416.5, 136, 97, 104, 86, 90; 409/137; 184/6.24

(56) References Cited

U.S. PATENT DOCUMENTS

| 4,655,940 | A | * | 4/1987 | Harms | 210/805 |
| 5,223,156 | A | | 6/1993 | Maier | |
| 5,380,446 | A | * | 1/1995 | Bratten | 210/805 |
| 6,508,944 | B1 | * | 1/2003 | Bratten | 210/805 |

* cited by examiner

Primary Examiner—Terry K. Cecil
(74) Attorney, Agent, or Firm—Crowell & Moring LLP

(57) ABSTRACT

An apparatus and method for circulating coolant liquid between machine tools and a coolant filtering unit through an overhead return line. A small stream of clean coolant is diverted to a flush tank and the tank is pressurized, e.g., with compressed air. Periodic release of the pressurized liquid from the flush tank through the overhead return line flushes deposited chips and other sediments from the return line.

10 Claims, 1 Drawing Sheet

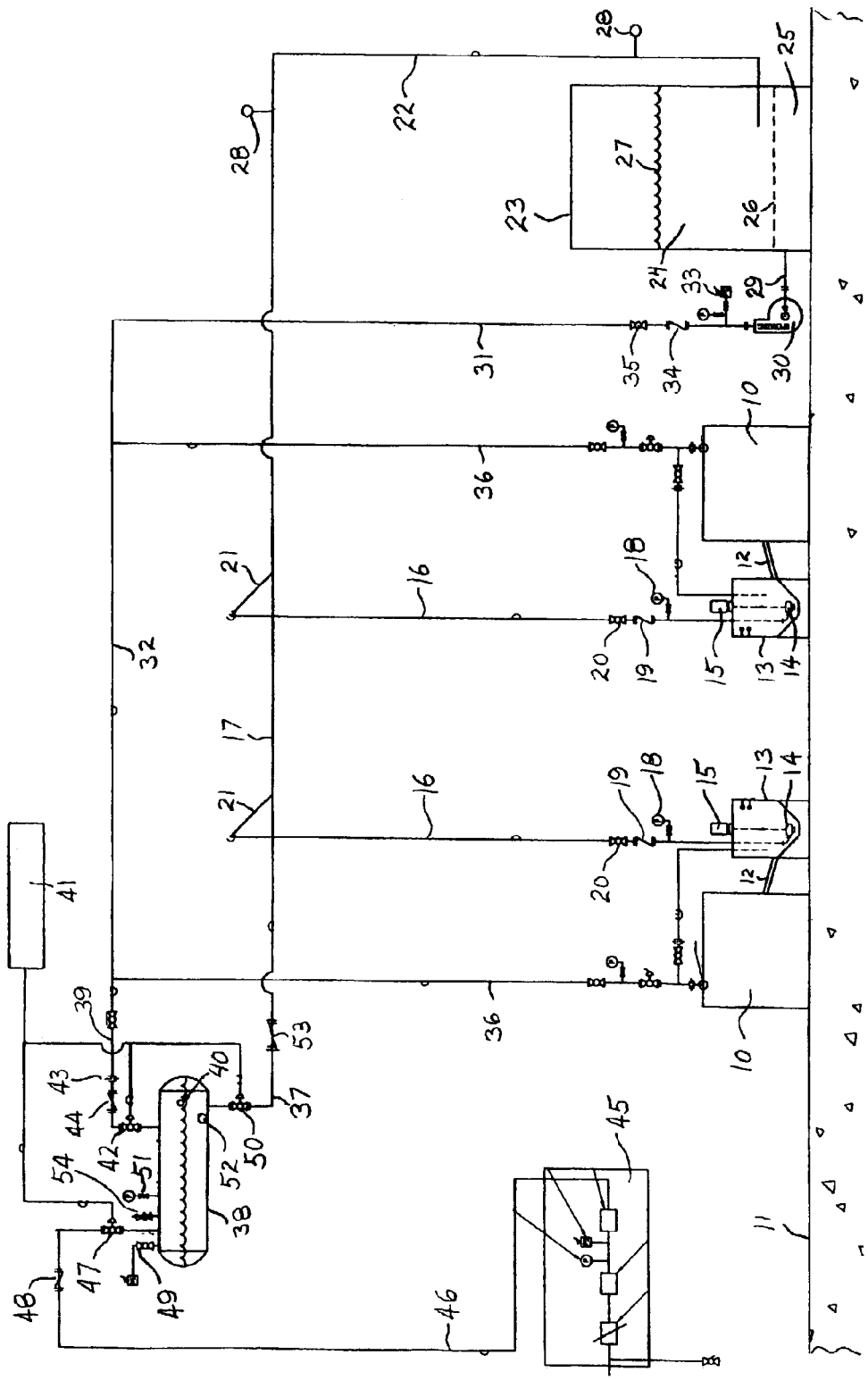

OVERHEAD RETURN PIPING SYSTEM

This application claims priority under 35 U.S.C. §119(e) Of U.S. Provisional Application No. 60/368,328, filed Mar. 29, 2002.

BACKGROUND OF THE INVENTION

This invention relates to an overhead return piping system specifically adapted for circulating coolant/lubricant between machine tools and a filtering unit.

Machine tools used in fabricating metal parts are supplied with a coolant liquid which both prevents the tools from overheating during machining operations and carries away heat produced during the machining. Such coolant liquid quickly becomes contaminated with metal chips and must be discharged from the machine tool and replaced with fresh coolant.

In the past, used coolant has been ejected from the machine tools into open troughs which lead to a sump in which the coolant is collected. The collected coolant is then pumped to a filtering apparatus, such as a vacuum belt filter, where metal chips and other contaminants are filtered out. After filtration, the clean coolant can be recirculated to the machine tools.

The use of in floor gravity flumes to collect used coolant, however, is subject to a number of disadvantages. In floor troughs prohibit flexibility to relocate machines. In addition, an extensive amount of civil engineering work is required during the installation phase of the flumes. Some in floor flumes can be as much as 10 feet deep, which requires extensive excavation and construction. All in floor flumes are confined spaces which are difficult to properly maintain. Finally, leaks in such in floor flumes due to poor workmanship can create significant environmental problems.

More space saving arrangements utilizing overhead return lines have also been attempted. One example of such an arrangement is disclosed in Maier, U.S. Pat. No. 5,223,156. In this arrangement, used coolant is discharged to a tank adjacent each machine tool and then pumped to one or more elevated tanks, from where it flows under the influence of gravity through an overhead return line to a collecting tank. The coolant may then be pumped from the collecting tank through a filter and recirculated to the machine tools. By means of a valve on the return line, the coolant flow to the collecting tank may be effected either continuously or intermittently. Intermittent flow achieves a kind of flushing effect which assists in removing metal chips that settle out of the used coolant. However, even with intermittent flow operation, the gravity flow is often insufficient to prevent deposition of chips from the used coolant in the overhead return line.

To prevent or remove such deposits, flushing nozzles have been installed along the overhead return line. Additional coolant can then be pumped through these nozzles in order to flush out the line. Although the use of such flushing nozzles alleviates the chip deposition problem at least to some extent, such systems can greatly increase the amount of coolant which must be circulated within the system, as well as significantly increase the overall piping complexity of the system, with consequent increases in investment and operating costs and decreases in economic efficiency.

SUMMARY OF THE INVENTION

Accordingly, it is an object of the present invention to provide an improved overhead return pipe system for circulating coolant between at least one machine tool and a coolant filtering unit.

Another object of the invention is to provide an overhead return pipe system which can reliably flush deposited chips and other sediment from the return pipes.

It is also an object of the present invention to provide an overhead return pipe system which can flush deposited chips from the return pipes without necessitating the circulation of excessive amounts of coolant.

A further object of the invention is to provide an improved method of circulating a coolant liquid between at least one machine tool and a coolant filtering unit.

These and other objects have been achieved in accordance with the present invention by providing an overhead return pipe system for circulating coolant liquid between at least one machine tool and a filter unit, comprising a collector for receiving used coolant liquid from each machine tool; a common overhead return line; a return riser leading from each collector to the overhead return line; a return pump for pumping used coolant from each collector through the associated return riser to the overhead return line; a filter unit comprising an upper dirty liquid chamber, a lower clean liquid chamber, and a liquid permeable filter member interposed between said dirty liquid chamber and said clean liquid chamber; a downpipe leading from an a first end of said overhead return line to said dirty liquid chamber of said filter unit; a common overhead clean liquid supply line; a clean liquid riser leading from said clean liquid chamber to said overhead supply line; a supply pump for pumping clean liquid from said clean liquid chamber of said filter unit to said overhead supply line; a branch supply line leading from said overhead supply line to each machine tool; a sealed flush tank communicating with a second end of said overhead return line; a flush valve interposed between said flush tank and said overhead return line; a liquid bleed line communicating between said overhead supply line and said flush tank; a flush supply valve on said liquid bleed line; a pressurized gas supply line communicating between a source of pressurized gas and said sealed flush tank; and a gas supply valve on said pressurized gas supply line.

In accordance with a further aspect of the invention, the objects are also achieved by providing a method of circulating coolant liquid between at least one machine tool and a filter unit, comprising the steps of a) collecting used coolant liquid from each machine tool; b) pumping the collected used coolant liquid to a common overhead return line; c) allowing the used coolant liquid to drain from said overhead return line to a dirty liquid chamber of a filter unit; d) filtering the coolant liquid from the dirty liquid chamber by passing it through a liquid permeable filter member into a clean liquid chamber; e) pumping the coolant liquid from the clean liquid chamber through a supply line to each machine tool; f) diverting a minor portion of the coolant liquid from said supply line to a flush tank; g) pressurizing the coolant liquid in the flush tank by introducing pressurized gas into said flush tank; and h) periodically discharging a burst of pressurized coolant liquid from said flush tank through said overhead return line to flush deposited materials from said overhead return line.

The apparatus and method of the invention enable deposited chips to be flushed from the return pipes by diverting a minor portion of the clean coolant liquid supplied to the machine tools to a flushing tank, pressurizing the liquid in the tank, e.g., with compressed air, and periodically discharging a pressurized burst of coolant from the flushing tank through the overhead through the overhead return pipe to flush any deposited chips or other contaminants from the return pipe.

BRIEF DESCRIPTION OF THE DRAWING

The invention will be described in further detail hereinafter with reference to an illustrative preferred embodiment shown schematically in the accompanying drawing FIGURE.

DETAILED DESCIPTION OF PREFERRED EMBODIMENTS

The drawing shows a plurality of machine tools 10 arranged on the floor 11 of a manufacturing plant. Used coolant liquid from the machine tools is discharged through lateral chutes 12 into collectors 13. In the drawing, two machine tools 10 and collectors 13 are illustrated, but it will be readily appreciated that the system of the invention may include any desired number of machine tools and associated collectors. From each collector 13, the used coolant liquid is pumped by a pump 14 driven, e.g., by an electric motor 15 through a return riser 16 to an overhead return line 17. Each return riser 16 may be provided with a pressure sensor or gauge 18 for monitoring the pressure, as well as a check valve 19 for preventing back flows of the used coolant liquid and a regulating valve 20 for controlling the flow of liquid through the return riser.

Preferably, each return riser 16 extends above overhead return line 17 and then communicates with overhead return line 17 through a downwardly inclined pipe section 21.

One end of overhead return line 17 is connected to a downpipe 22 which leads to a filtering unit 23 comprising an upper, dirty liquid chamber 24 and a lower, clean liquid chamber 25 separated by a liquid permeable filter member 26.

Filter unit 23 may desirably be a known vacuum belt filter familiar to persons skilled in the art. Downpipe 22 may open into the dirty liquid chamber either above or below the liquid level 27 of the dirty coolant therein. Preferably, however, downpipe 22 enters the dirty liquid chamber 24 below the liquid level, so that a liquid seal is created at the discharge end of the downpipe. As a result, the descent of used coolant through the downpipe creates a negative pressure in overhead return line 17 which assists in conveying the used coolant along the return line. Vacuum gauges 28 may be provided on overhead return line 17 and/or downpipe 22 to monitor the pressure conditions.

If desired, overhead return line 17 may be provided with a slight slope toward the downpipe end, but this is not absolutely necessary because the inertia of the pumped liquid through pipe segments 21 as well as the negative pressure generated by the descent of used coolant through downpipe 22 are generally sufficient to move the coolant along overhead return line 17.

Clean coolant liquid is withdrawn from clean liquid chamber 25 through discharge line 29 by pump 30 and pumped through supply riser 31 to an overhead supply line or header 32. If desired, supply riser 31 may be provided with a pressure monitor or gauge 33, a check valve 34 to prevent return flows, and a regulating valve 35 for controlling the flow of clean coolant liquid.

From overhead supply line 32, clean coolant passes through branch supply lines 36 back to the respective machine tools 10, where it again serves to lubricate the tool, to prevent overheating of the cutting elements, and to carry away chips produced during the machining operations.

A flush tank 38 is connected to the end 37 of return line 17 remote from downpipe 22. A minor portion of clean coolant from overhead supply line 32 is diverted through a bleed line 39 to flush tank 38. A float sensor 40 located in flush tank 38 senses when the liquid reaches the desired level and transmits a signal to a controller 41, which in turn sends a signal to a regulating valve 42 to shut off the flow of clean coolant liquid to flushing tank 38. A flow restrictor 43 is advantageously provided on bleed line 39 to assure that only a limited amount of clean coolant liquid is diverted from overhead supply line 32. Flow restrictor 43 also assists in maintaining a suitable back pressure in overhead supply line 32. Flow restrictor 43 may, for example, be a fixed orifice plate. A check valve 44 is additionally provided on bleed line 39 to prevent pressurized gas, as described hereinafter, from flush tank 38 from flowing to the overhead coolant supply line 32. A low liquid level sensor 52 is also provided in the flush tank 38.

A source of pressurized gas, such as compressor 45, is also provided. Compressed air source 45 communicates with flush tank 38 through a compressed air supply line 46. A gas flow regulating valve 47, connected to and operated by controller 41, is provided on compressed air supply line 46 to facilitate control of the flow of pressurized gas into flush tank 38. A pressure sensor 51 is provided on flush tank 38 which can sense the pressure within the tank and through communicating with controller 41 cause regulating valve 47 to be closed when a desired pressure is reached or to be opened if the pressure is below a desired value. A check valve 48 is also provided on pressurized air supply line 46 to prevent any back flow of coolant liquid from flush tank 38 through the compressed air supply line. A solenoid operated vent valve and controller 49 also are provided in communication with the top of flush tank 38. Vent valve 49 may be configured to function as a safety pressure relief valve, if desired, or a separate safety valve 54 may be provided.

Between flush tank 38 and overhead return line 17 there is a flush valve 50, which is also connected to and controlled by controller 41. A check valve 53 preferably is also provided on overhead return line 17 to prevent any possibility of used coolant from the return line entering flush tank 38.

The operation of the overhead return pipe system of the invention is as follows. Used coolant from machine tools 10 flows through troughs 12 to collectors 13 from where it is pumped by pumps 14 through return risers 16 and connecting pipes 21 to the overhead return line 17. The used coolant then flows along overhead return line 17 to downpipe 22 through which it descends to the dirty liquid chamber 24 of filtering unit 23. If downpipe 22 enters dirty liquid chamber 24 below the liquid level 27, pressure sensors 28 may be provided to monitor the negative pressure generated by the descent of the coolant liquid through the un-vented downpipe 22. In the filter unit, the coolant is passed through filtering member 26 to clean liquid chamber 25. The filtered coolant is then is discharged from clean liquid chamber 25 through discharge line 29 to pump 30, which pumps it through supply riser 31 to overhead supply line 32. The coolant liquid is then conveyed from overhead supply line 32 through branch supply lines 36 back to the machine tools 10. The machine tools utilize the coolant to lubricate the tooling, to remove heat from the cutters and to flush chips away from the work surface. The cycle is then repeated.

As the used coolant passes along overhead return lines 17, some of the entrained chips and other contaminants settle out and start to form deposits in the return line. If this deposition were allowed to proceed, it would eventually block the return line and impede the circulation of the coolant to the machine tools. Accordingly, the apparatus of the invention also provides for a periodic flushing of the overhead return lines from pressure flushing tank 38.

As clean coolant liquid is circulated through overhead supply line 32 and branch supply lines 36 to the machine tools 10, a minor portion of the coolant liquid is diverted through bleed line 39 to fill flush tank 38. During this filling operation, flow regulating valve 42 is open and pressurized gas supply valve 47 and flush valve 50 are both closed. If the pressure in liquid supply header 32 is less than the operating pressure of flush tank 38, then vent valve 49 should also be open during filling to enable the liquid to flow into the tank. The diverted portion of the clean coolant need not be large. For example, it is sufficient to divert less than 10%, and preferably less than 5%, of the flow through overhead supply line 32. The liquid level to which the flush tank is filled may vary, but it is generally effective to have from 40 to 70% of the tank volume filled with liquid. A 50% liquid fill level has been found to work well.

When the coolant liquid in flush tank 38 reaches the desired level as indicated by, e.g., float sensor 40, a signal is transmitted to controller 41, which in turn closes flow regulating valve 42 and opens pressure regulating valve 47. Pressurized gas, such as compressed air from compressor 45, is then admitted to flush tank 38 to pressurize the tank. The tank pressure may vary over a broad range, for example, from 30 psi to more than 100 psi. Excellent results are obtained at pressure levels in the range from about 40 to about 60 psi, for example, 50 psi. When pressure sensor 51 detects that the desired pressure has been reached, it signals controller 41, which then shuts off pressure regulating valve 47. Excess pressure may be released by safety valve 54 located on top of tank 38. The flush tank is now primed and ready to execute a flushing operation.

If the pressure in clean coolant supply line 32 is less than the operating air pressure in tank 38, then vent valve 49 should be opened during tank refill to aid the flow of liquid into the tank. For example, the flush tank may be operated at a pressure of 50 psi, while the pump for the overhead supply line may only generate a pressure of 30 psi. In such case some of the air would need to be vented from the flush tank to facilitate proper filling. If, however, the operating pressure produced by liquid supply pump 30 in overhead supply line 32 is greater than the air pressure in flush tank 38, it is not necessary to open the vent 49 to fill the tank 38. Indeed, it may be advantageous not to vent the tank during filling because the introduction of liquid into the tank will compress the air which is already in the tank and thereby reduce the amount of additional compressed air which must be introduced through compressed air supply line 46.

Flushing of the overhead return line may be initiated either after elapse of a predetermined amount of time (e.g., every half hour), or as a result of pressure or flow measurements which indicate a need to flush out the line. When it is desired to initiate flushing, controller 41 opens flush valve 50, which releases a burst of pressurized coolant liquid from flush tank 38 through overhead return line 17. The rush of coolant liquid, propelled by the pressure within the tank, sweeps deposited chips and other sediment from return line 17 and carries them to dirty liquid chamber 24 of filtering unit 23.

After the flushing operation, when low liquid level sensor 52 detects that the flush tank 38 has been substantially emptied, controller 41 closes flush valve 50 before air from the flush tank can enter return line 17 and opens flow regulating valve 42 to commence refilling flush tank 38 for the next flushing operation.

The apparatus and method of the invention have the following advantages:

The arrangement significantly reduces water hammer during initial fill of the coolant supply lines because air in the supply pipe is expelled into the surge tank from which it may be vented or compressed as the tank is filled with liquid.

When the machine tools are not in operation, e.g., when the plant is closed for a weekend, continued circulation of coolant can be maintained by opening both flow regulating valve 42 and flush valve 50 so that coolant can pass from coolant supply line 32 to overhead return line 17.

The pressurized flush tank also promotes aeration of the coolant, which assists in preventing bacterial growth in the circulating liquid.

The method and apparatus of the invention make it possible to eliminate the use of flush nozzles, thereby reducing the piping complexity of the system, the overall pumping and circulation requirements and improving the operating economies of the system.

Due to the comparatively small size of the flush tank, which may be as small as 60 gallons, the required filter holding volume can be dramatically reduced.

The use of a comparatively small elevated tank also reduces the load on roof trusses from which the tank is suspended, thereby facilitating more economically construction.

Once the flush tank is filled, there is no need to divert clean coolant liquid from the coolant supply line until after the next flushing operation is completed. Thus, the overall coolant flow requirements are reduced because no pipe flush flow is required, only the amount of coolant needed by the machine tools need to be circulated through the system.

The flush tank need not be mounted in an elevated position if desired, it could be mounted on the plant floor, since the pressurized gas in the tank will force the coolant through the overhead return line even from a low position.

The overhead return pipe system of the invention also facilitates the use of smaller pipe than required by prior overhead gravity return systems. This both reduces loading on the roof trusses from which the overhead pipes are suspended and also decreases the initial cost of the apparatus.

The pressurized burst of coolant liquid produced by the apparatus and method of the present invention is more efficient and effective in flushing the overhead return line than the gravity flow arrangements used in prior systems.

It can thus be seen that the apparatus and method of the present invention promote efficient circulation of coolant between machine tools and a coolant filtering unit, facilitate effective flushing of deposits from used coolant return lines, and increase the cost effectiveness of coolant circulation.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An overhead return pipe system for circulating coolant liquid between at least one machine tool and a filter unit, said return pipe system comprising:
   a collector for receiving used coolant liquid from each machine tool;
   a common overhead return line;
   a return riser leading from each collector to the overhead return line;

a return pump for pumping used coolant from each collector through the associated return riser to the overhead return line;

a filter unit comprising an upper dirty liquid chamber, a lower clean liquid chamber, and a liquid permeable filter member interposed between said dirty liquid chamber and said clean liquid chamber;

a downpipe leading from a first end of said overhead return line to said dirty liquid chamber of said filter unit;

a common overhead clean liquid supply line;

a clean liquid riser leading from said clean liquid chamber to said overhead supply line;

a supply pump for pumping clean liquid from said clean liquid chamber of said filter unit to said overhead supply line;

a branch supply line leading form said overhead supply line to each machine tool;

a sealed flush tank communicating with a second end of said overhead return line;

a flush valve interposed between said flush tank and said overhead return line;

a liquid bleed line communicating between said overhead supply line and said flush tank;

a flush supply valve on said liquid bleed line;

a pressurized gas supply line communicating between a source of pressurized gas and said sealed flush tank; and a gas supply valve on said pressurized gas supply line.

2. A return pipe system according to claim 1, further comprising a check valve on said bleed line for preventing pressurized gas from said flush tank from entering said overhead supply line.

3. A return pipe system according to claim 1, further comprising a check valve interposed between said flush tank and said source of pressurized gas for preventing liquid from said flush tank from entering said source of pressurized gas.

4. A return pipe system according to claim 1, wherein said source of pressurized gas is an air compressor.

5. A return pipe system according to claim 1, further comprising control means for periodically:

a) closing said flush valve and said gas supply valve and opening said flush supply valve to admit flush liquid to said flush tank;

b) closing said flush supply valve and opening said gas supply valve to pressurize said flush tank; and c) closing said gas supply valve and opening said flush valve to discharge a pressurized burst of liquid from said flush tank through said overhead return line to flush deposited solids from said overhead return line to said filter unit.

6. A return pipe system according to claim 1, further comprising a flow restrictor on said bleed line for limiting the flow of liquid from the overhead supply line to the flush tank.

7. A return pipe system according to claim 1, wherein each return riser extends above the overhead return line and then communicates with the overhead return line through a downwardly inclined connector pipe.

8. A return pipe system according to claim 1, wherein said downpipe enters said dirty liquid chamber of the filter unit below a liquid level maintained in said dirty liquid chamber, whereby a pressure seal is created and a descent of dirty liquid through said downpipe creates a negative pressure in the overhead return line.

9. A return pipe system according to claim 1, further comprising a liquid responsive switch in said flush tank for closing said flush supply valve when a desired liquid level iS achieved in said flush tank.

10. A return pipe system according to claim 1, further comprising a pressure responsive switch associated with said flush tank for closing said gas supply valve when a desired gas pressure level is achieved in said flush tank.

* * * * *